(12) United States Patent
Schultink et al.

(10) Patent No.: US 10,264,936 B2
(45) Date of Patent: Apr. 23, 2019

(54) VACUUM CLEANER FILTER BAG HAVING A HIGH-STRENGTH WELD SEAM, METHOD FOR PRODUCING SAID VACUUM CLEANER FILTER BAG, AND ULTRASONIC WELDING SYSTEM FOR PRODUCING AN ULTRA-STRONG WELD SEAM

(71) Applicant: Eurofilters N.V., Overpelt (BE)

(72) Inventors: Jan Schultink, Overpelt (BE); Ralf Sauer, Overpelt (BE)

(73) Assignee: Eurofilters N.V., Overpelt (BE)

( * ) Notice: Subject to any disclaimer, the term of this patent is extended or adjusted under 35 U.S.C. 154(b) by 199 days.

(21) Appl. No.: 15/310,052

(22) PCT Filed: Apr. 27, 2015

(86) PCT No.: PCT/EP2015/058999
§ 371 (c)(1),
(2) Date: Nov. 9, 2016

(87) PCT Pub. No.: WO2015/172995
PCT Pub. Date: Nov. 19, 2015

(65) Prior Publication Data
US 2017/0265699 A1 Sep. 21, 2017

(30) Foreign Application Priority Data
May 12, 2014 (EP) .................................. 14167974

(51) Int. Cl.
*B01D 46/02* (2006.01)
*A47L 9/14* (2006.01)
(Continued)

(52) U.S. Cl.
CPC ............ *A47L 9/14* (2013.01); *B01D 46/0001* (2013.01); *B01D 46/02* (2013.01); *B29C 65/08* (2013.01);
(Continued)

(58) Field of Classification Search
CPC ... A47L 9/14; B01D 2265/04; B01D 2273/28; B01D 2275/10; B01D 2279/55; B01D 46/02; B01D 46/0001
See application file for complete search history.

(56) References Cited

U.S. PATENT DOCUMENTS

| 5,647,881 A | * | 7/1997 | Zhang | ........................ A47L 9/14 |
| | | | | 15/347 |
| 2007/0084166 A1 | * | 4/2007 | Wattenberg | ............... A47L 9/14 |
| | | | | 55/467 |
| 2011/0265283 A1 | * | 11/2011 | Duncan | ..................... A47L 9/14 |
| | | | | 15/347 |

FOREIGN PATENT DOCUMENTS

| DE | 20 2004 012754 U1 | 10/2004 |
| DE | 20 2005 000918 U1 | 3/2005 |

(Continued)

OTHER PUBLICATIONS

International Search Report completed Jul. 21, 2015 for International Application No. PCT/EP2015/058999.
(Continued)

*Primary Examiner* — Robert Clemente
(74) *Attorney, Agent, or Firm* — Brinks Gilson & Lione

(57) ABSTRACT

The present invention relates to a vacuum cleaner filter bag made of a thermally weldable filter material which forms the sealed internal space of the vacuum cleaner filter bag. The internal space is thereby closed at least on one side by means of a weld seam configured according to the invention, in the case of which at least two layers of the filter material are welded together. The weld seam configured according to the present invention is distinguished by a far higher tearing strength, compared with weld seams as are known from the state of the art. The invention relates in addition to a method for the production of the vacuum cleaner filter bag, to a tool
(Continued)

for the production of the high-strength weld seam and also to an ultrasonic welding unit in which this tool is integrated.

13 Claims, 5 Drawing Sheets

(51) Int. Cl.
  *B29C 65/08* (2006.01)
  *B29C 65/00* (2006.01)
  *B01D 46/00* (2006.01)
  *B29L 31/00* (2006.01)
  *B29C 65/02* (2006.01)
(52) U.S. Cl.
  CPC ........ *B29C 66/1122* (2013.01); *B29C 66/133* (2013.01); *B29C 66/21* (2013.01); *B29C 66/232* (2013.01); *B29C 66/43* (2013.01); *B29C 66/4312* (2013.01); *B29C 66/7294* (2013.01); *B29C 66/81419* (2013.01); *B29C 66/81433* (2013.01); *B29C 66/8322* (2013.01); *B01D 2265/04* (2013.01); *B01D 2273/28* (2013.01); *B01D 2275/10* (2013.01); *B01D 2279/55* (2013.01); *B29C 65/02* (2013.01); *B29C 66/723* (2013.01); *B29L 2031/7128* (2013.01)

(56) References Cited

FOREIGN PATENT DOCUMENTS

EP    1 795 247 A1   6/2007
WO   WO 96/32878 A1  10/1996
WO   WO 02/43960 A1   6/2002

OTHER PUBLICATIONS

International Preliminary Report on Patentability completed Jul. 21, 2015 for International Application No. PCT/EP2015/058999.

* cited by examiner

FIG 1
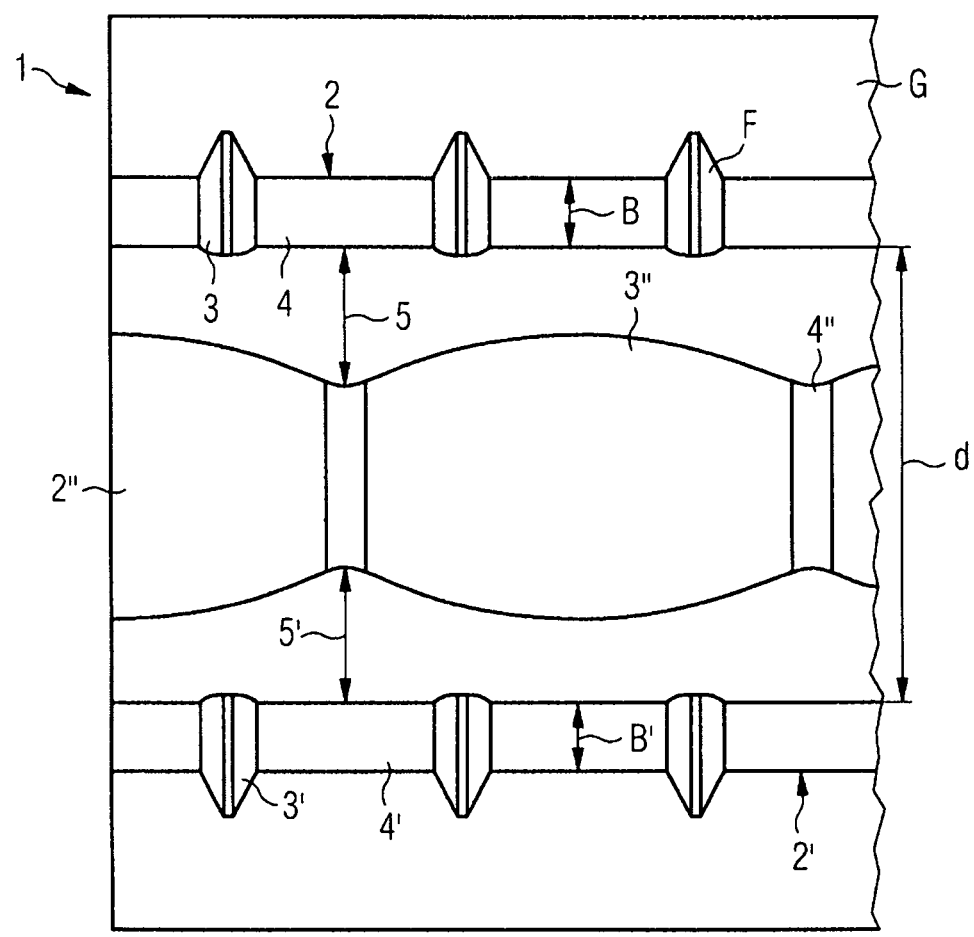
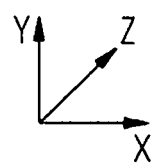

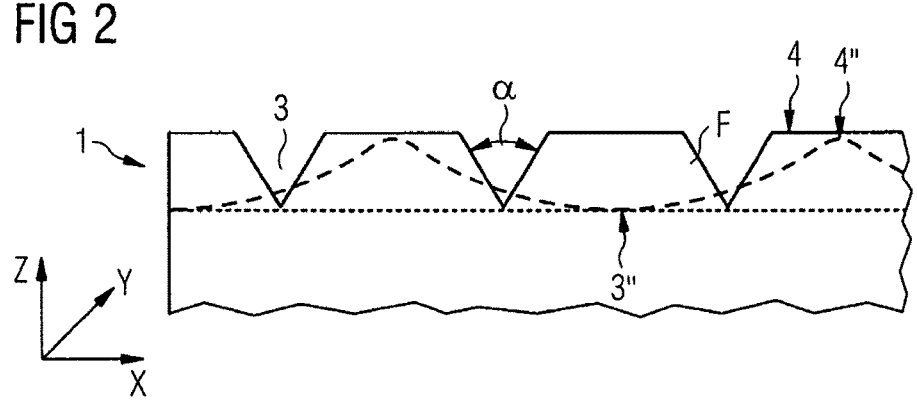
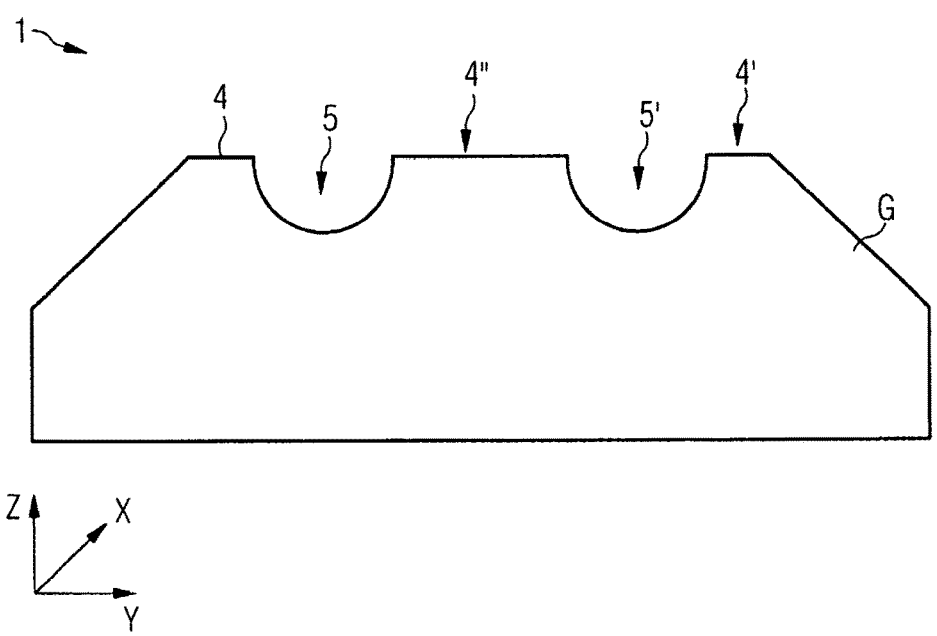

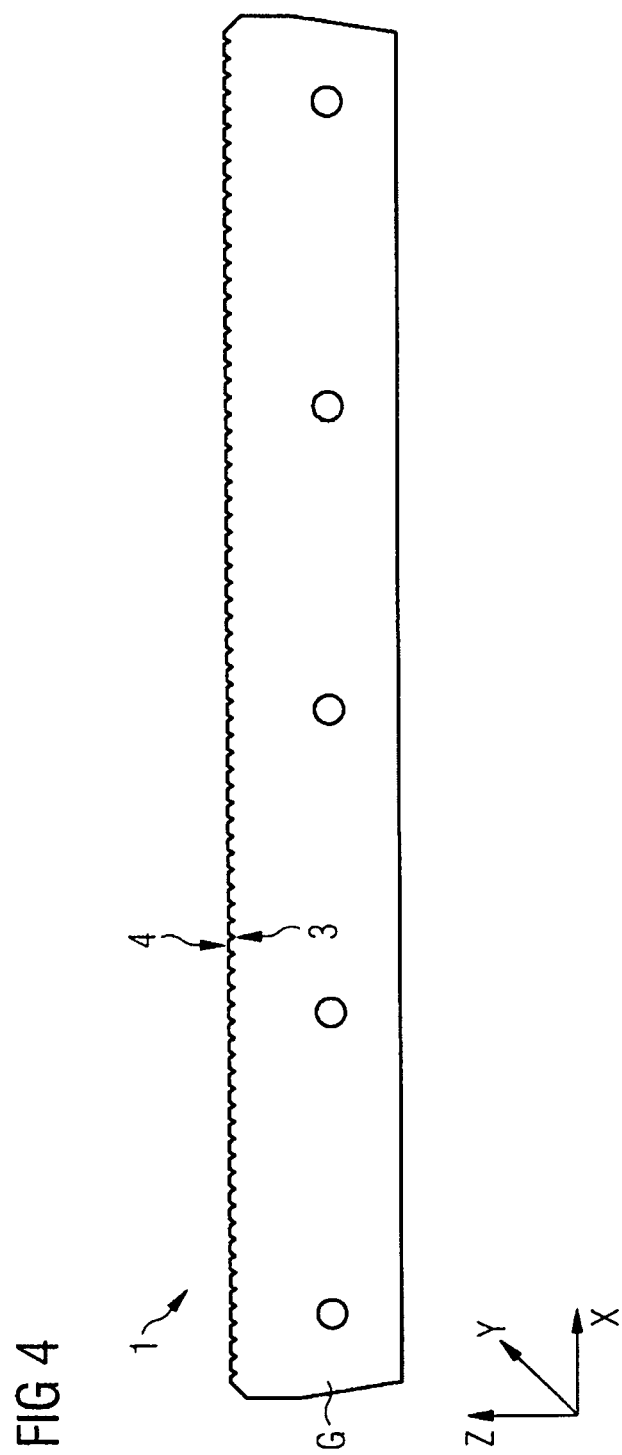

VACUUM CLEANER FILTER BAG HAVING A HIGH-STRENGTH WELD SEAM, METHOD FOR PRODUCING SAID VACUUM CLEANER FILTER BAG, AND ULTRASONIC WELDING SYSTEM FOR PRODUCING AN ULTRA-STRONG WELD SEAM

This application claims the benefit under 35 U.S.C. § 371 of International Application No. PCT/EP2015/058999, filed Apr. 27, 2015, which claims the benefit of European Patent Application No. 14167974.6, filed May 12, 2014, which are incorporated by reference herein in their entirety.

The present invention relates to a vacuum cleaner filter bag made of a thermally weldable filter material which forms the sealed internal space of the vacuum cleaner filter bag. The internal space is thereby closed at least on one side by means of a weld seam configured according to the invention, in the case of which at least two layers of the filter material are welded together. The weld seam configured according to the present invention is distinguished by a far higher tensile strength, compared with weld seams as are known from the state of the art. The invention relates in addition to a method for the production of the vacuum cleaner filter bag, to a tool for the production of the high-strength weld seam and also to an ultrasonic welding unit in which this tool is integrated.

For the manufacture of vacuum cleaner filter bags made of nonwovens, it is normal to join the nonwovens or multilayer nonwoven laminates formed herefrom which are used as filter material are joined by ultrasonic welding. Normally, continuous, linear weld seams or even interrupted linear weld seams are hereby configured.

However, the previously configured weld seams still represent a permanent weak point in such manufactured vacuum cleaner filter bags. In particular in the case of an already high degree of filling with dirt particles (degree of clogging) of the vacuum cleaner filter bag, the result thereby is bursting of the weld seam or tearing of the nonwoven material at the weld seam so that the vacuum cleaner filter bag is damaged or destroyed and in fact any dirt contained escapes uncontrolled from the vacuum cleaner filter bag. In the case of ultrasonic welding of nonwovens with a basis weight of less than 200 g/m$^2$, this problem is nowadays very well controlled. There are difficulties in particular if nonwovens with a basis weight of more than 200 g/m$^2$ are intended to be welded together or if the weld seam must join more than two filter material layers (e.g. in the region of a side fold) and the basis weight of the e.g. four nonwoven layers is then in total at over 400 g/m$^2$.

It is the object of the present invention to provide a weld seam in a vacuum cleaner filter bag formed from thermally weldable materials, in particular from nonwoven materials, which weld seam has improved tearing or tensile strength (maximum tensile strength) so that the previously mentioned problems in the vacuum cleaner filter bag according to the invention are prevented. The present invention hence sets the object of indicating a corresponding vacuum cleaner filter bag with a high-strength weld seam. Likewise, it is the object of the present invention to indicate a method for the production of a corresponding vacuum cleaner filter bag and also a tool which can be used in the previously mentioned method and also an ultrasonic welding unit which includes this tool.

This object is achieved, with respect to a vacuum cleaner filter bag with a specially configured weld seam, by the features of patent claim 1, with respect to a method for the production of the vacuum cleaner filter bag according to the invention, by the features of patent claim 12, with respect to a tool for formation of the weld seam, by the features of patent claim 14 and also, with respect to an ultrasonic welding unit, by the features of patent claim 24. The respective dependent patent claims thereby represent advantageous developments.

The present invention hence relates to a vacuum cleaner filter bag made of a thermally weldable filter material, a sealed internal space of the vacuum cleaner filter bag being defined by the filter material. The vacuum cleaner filter bag according to the invention thereby comprises at least one linearly extending weld seam, by means of which the internal space of the vacuum cleaner filter bag is sealed at least on one side relative to the environment. The weld seam thereby joins at least two layers of the filter material together, the weld seam having, in the direction of the linear course, alternately welded and non-welded regions of the at least two layers. It is thereby essential to the invention that the welded regions have a dimensioning, measured in the direction of the linear course (length of the welded regions), of 1.0 mm to 10.0 mm and the non-welded regions have a dimensioning, measured in the direction of the linear course (length of the non-welded regions), of >1.0 mm to 5.0 mm.

The vacuum cleaner filter bag according to the present invention is distinguished by being formed by a thermally weldable filter material, e.g. made of nonwoven materials. The vacuum cleaner filter bag thereby has at least one weld seam in which at least two layers of the thermally weldable filter material are welded together so that an internal space of the vacuum cleaner filter bag is configured in which the dust material is received. The internal space of the vacuum cleaner filter bag is thereby separated relative to the exterior. In addition, an inlet opening for air to be cleaned is present. The weld seam thereby has a linear configuration and can extend for example linearly but also in a curve. In the direction of the linear course, the weld seams have alternately welded and non-welded regions.

In particular, the weld seam represents a weld seam of the vacuum cleaner filter bag which extends circumferentially around the edge.

Surprisingly, it has now emerged that, by introducing relatively long non-welded regions in the region of the weld seam with a length of >1.0 mm to 5.0 mm, i.e. insertion of interruptions of more than 1.0 mm length into the weld seam, higher tearing strength of the weld seam results, compared with weld seams known from the state of the art, so that the vacuum cleaner filter bag, even in the case of high mechanical stresses, does not burst in the region of the weld seam. In addition, it is surprising that, despite the relatively long non-welded regions, the solidity of the filter bag is not negatively affected, i.e. the degree of separation is just as good as in the case of a filter bag with a continuously welded weld seam.

According to a preferred embodiment, the non-welded regions have a dimensioning, measured in the direction of the linear course, of 1.2 mm to 3.0 mm, particularly preferably of 1.4 mm to 2.5 mm.

Alternatively or additionally hereto, it is advantageous if the welded regions have a dimensioning, measured in the direction of the linear course, of 1.5 mm to 7.5 mm, preferably of 1.75 mm to 5.0 mm, particularly preferably of 2.0 mm to 3.5 mm.

Furthermore, it is advantageous that, in the direction of the linear course of the weld seam, the dimensioning of the non-welded regions is less than the dimensioning of the welded regions, i.e. it is preferred if the welded regions have a longer configuration than the non-welded regions.

In particular, the alternating arrangement of welded and non-welded regions is equidistant, i.e. the welded and non-welded regions always have the same length or are repeated at the same period in the direction of the longitudinal course of the weld seam.

Perpendicular to the linear course, the weld seam has in particular a dimensioning (width of the weld seam) of 0.8 mm to 10.0 mm, preferably of 1.3 mm to 5.0 mm, particularly preferably of 1.4 mm to 3.0 mm, i.e. the welded regions have the previously mentioned preferred width.

The welded regions thereby have in particular a substantially rectangular or rectangular configuration. There is included herein, for example a square embodiment, however embodiments in which the dimensioning of the rectangle is greater in the longitudinal direction of the weld seam than in the dimensioning present perpendicular to the linear course (rectangular configuration of the welded regions) are particular advantageous. However, also geometric configurations of the welded regions which differ herefrom, e.g. round, circular, elliptical, oval, star-shaped or cruciate configurations of the welded regions, are conceivable. In this case, the respective maximum extension of the welded regions in the course direction of the linear weld seam or in the perpendicular direction hereto is assumed as length or width of the welded regions.

Furthermore, it is preferred if each layer of the filter material is a single or multilayer nonwoven material, preferably with a basis weight of at least 150 g/m$^2$, preferably at least 200 g/m$^2$, further preferably at least 250 g/m$^2$, in particular at least 300 g/m$^2$. The total basis weight of the material to be welded now depends upon the basis weight of the filter medium and upon the number of layers disposed one above the other.

It is hereby possible that the filter material is a single-layer nonwoven material and hence is formed from merely one layer of a nonwoven. Preferably, the filter materials are however multilayer nonwoven materials so that at least 3, preferably 4 to 8, in particular 4 or 5, layers of a nonwoven material are present. Included in these filter materials are also the filter materials as described for the vacuum cleaner filter bag according to EP 1 795 247 A1. All of the embodiments of this patent application with respect to the filter materials used are also made the subject of the present patent application.

The vacuum cleaner filter bag according to the present invention can thereby have walls which consist of one or more, e.g. two, layers of a filter material, the filter material itself being able to represent a single or multilayer nonwoven material.

The weld seam according to the present invention has high strength. The tensile strength is thereby determined according to DIN EN 29073-3. Determination of the maximum tensile strength is defined there unequivocally. The standard relates in general to nonwovens. The weld seam to be tested is clamped centrally between the jaws of the tensile testing machine for testing. During tearing of a test piece, in which 4 layers of a nonwoven have been joined together by a weld seam, respectively 2 layers are clamped in the one jaw and 2 layers in the other jaw.

This tensile strength thereby has preferably at least 30 N, preferably at least 50 N, particularly preferably at least 80 N (in the case of a clamping width according to the standard of 5 cm).

According to a first preferred embodiment, the vacuum cleaner filter bag is configured in the form of a flat bag. At least two layers of the filter material are hereby welded together circumferentially at the edge, the welding being configured at least in regions, preferably completely, as weld seam, as described above. The flat bag thereby has a front- and a rear-side, both the front- and the rear-side of the flat bag being formed respectively at least from one layer of a filter material. Each side of the flat bag, i.e. e.g. front- and rear-side, can thereby be formed for example also respectively from two layers of a filter material. Each layer of the filter material can be formed in turn, per se, from single or multilayer nonwoven materials.

Likewise, it is possible that the vacuum cleaner filter bag according to the present invention has the form of a side-gusseted bag. The side-gusseted bag thereby corresponds essentially to the previously described flat bag. Also the side-gusseted bag has a front- and rear-side which can be configured as described above. In contrast to the flat bag, the side-gusseted bag is folded in on two opposite sides and hence has side folds. At the end-sides, the side-gusseted bag is configured like the flat bag. In the case of such a side-gusseted bag, two longitudinal- and two transverse sides are hence present, at least two layers of the filter material being welded together on the longitudinal side and being folded into the vacuum cleaner filter bag and being welded together on the transverse side, at least the transverse-side weld seams being configured preferably as complete weld seams, as described above.

Alternatively and likewise preferably, it is also possible that the vacuum cleaner filter bag according to the present invention has the form of a 3D bag or block- or block-bottom bag, at least two layers of the filter material being welded with a weld seam defined in one of the preceding claims.

The present invention likewise relates to a method for the production of a previously described vacuum cleaner filter bag, in which at least one linearly extending weld seam is produced by thermal welding, in particular by ultrasonic welding of at least two layers of the filter material, the weld seam having, in the direction of the linear course, alternately welded and non-welded regions of the at least two layers, the welded regions having a dimensioning, measured in the direction of the linear course (length of the welded regions), of 1.0 mm to 10.0 mm and the non-welded regions having a dimensioning, measured in the direction of the linear course (length of the welded regions), of >1.0 mm to 5.0 mm.

With the method according to the invention, joining of the at least two layers of the thermally weldable filter material, in particular of the nonwoven layers of the vacuum cleaner filter bag, can be effected simply, so that an extremely tear-resistant weld seam is produced with the simplest means.

According to a particularly preferred embodiment, the linear weld seam is produced by ultrasonic welding, a tool being used which has a basic body and also at least one first bar which extends longitudinally in an x-direction, has a width in a y-direction and is projected in z-direction, with a planar working surface which terminates in z-direction and has a plurality of notches which extend parallel in y-direction and are recessed starting from the working surface in z-direction, defining a plurality of weld faces. The longitudinal dimensioning of the notches in x-direction is hereby of >1.0 mm to 5.0 mm and the longitudinal dimensioning of the weld faces in x-direction is 1.0 mm to 10.0 mm. In the case of the method according to the invention, a counterpart to the tool is used in addition, which is disposed above the first bar during the welding process. The at least two layers for producing the weld seam of the filter material are disposed between the tool and counterpart, pressing of the layers of the filter material together is effected subsequently by counterpart and tool being moved towards each other, the layers of the filter material to be welded being pressed against each other. For the welding, ultrasound is coupled into the counterpart and/or into the tool.

As counterpart, for example a metal bar of a planar configuration can be used, which bar can have for example the same dimensioning, with respect to its width, as the width of the weld faces. Likewise, it is conceivable that the counterpart has a working surface which is configured in mirror-image to the working surface of the tool, i.e. has likewise projected weld faces and notches configured therebetween. In this case, the counterpart should be disposed relative to the tool such that the weld faces of the tool are situated one above the other. The same applies for the notches.

During compression of the layers of the filter material, compression of the filter material hence takes place in the region of the raised weld faces whilst the soft filter material can penetrate into the notches. If in this state ultrasound is coupled into the tool and/or the counterpart, a short-term melting of the filter material takes place in the compressed region of the filter material, i.e. in the region of the weld faces, so that the welded regions of the weld seam are produced in this region. In the region of the notches, i.e. in the regions in which no compression of the filter material is provided, no welding takes place.

The present invention relates, in addition, to a tool for an ultrasonic welding unit, comprising a basic body and also at least one first bar which extends longitudinally in an x-direction, has a width in a y-direction and is projected in a z-direction, with a planar working surface which terminates in z-direction and has a plurality of notches which extend parallel in y-direction and are recessed starting from the working surface in z-direction, defining a plurality of weld faces, the longitudinal dimensioning of the notches in x-direction being of >1.0 mm to 5.0 mm and the longitudinal dimensioning of the weld faces in x-direction being 1.0 mm to 10 mm. With this tool, the previously described method according to the invention can be implemented and the initially described vacuum cleaner filter bag according to the invention can be produced by welding at least two layers of filter materials together.

The x-, y- and z coordinates or -directions hereby designate the axes of a three-dimensional cartesian coordinate system.

It is hereby preferred in the case of the tool that the longitudinal dimensioning of the notches in x-direction is of 1.2 mm to 3.0 mm, particularly preferably of 1.4 mm to 2.5.

Alternatively or additionally to the previously mentioned embodiment, it is advantageous if the longitudinal dimensioning of the weld faces in x-direction is of 1.5 mm to 7.5 mm, preferably of 1.75 mm to 5.0 mm, particularly preferably of 2.0 mm to 3.5 mm.

It is likewise advantageous that the longitudinal dimensioning of the weld faces in x-direction is greater than the longitudinal dimensioning of the notches.

In particular, the notches are disposed equidistantly in x-direction.

It is hereby further preferred that the width of the weld faces in y-direction is of 0.8 mm to 10.0 mm, preferably of 1.3 mm to 5.0 mm, particularly preferably of 1.4 mm to 3.0 mm.

The weld faces of the tool advantageously have a substantially rectangular or rectangular outline.

In addition, it is possible that the notches have a triangular or trapezoidal profile in projection on an xz-plane, the sides of the notches forming the triangular profile or the trapezoidal profile preferably having an angle $\alpha$ of 30° to 120°, preferably 40° to 100°, relative to each other.

According to a particularly preferred embodiment, the basic body has at least one second bar which extends longitudinally in an x-direction, has a width in a y-direction and is projected in a z-direction, with a planar working face which terminates in z-direction and has a plurality of notches which extend parallel in y-direction and are recessed starting from the working surface in z-direction, defining a plurality of weld faces. The longitudinal dimensioning of the notches in x-direction is hereby of >1.0 mm to 5.0 mm and the longitudinal dimensioning of the weld faces in x-direction 1.0 mm to 10.0 mm. The at least one second bar is disposed parallel in x-direction and at a spacing relative to the at least one first bar. Preferably, the working surface of the at least one second bar has the same dimensioning, i.e. the same height in z-direction, as that of the at least one first bar.

In particular, the at least one second bar has an identical configuration to the first bar, i.e. the notches and working surfaces have respectively the same dimensioning and the same spacing relative to each other.

With a tool configured preferably as described above, two weld seams can hence be produced, for example simultaneously, by welding a plurality of layers of filter materials together. These weld seams extend preferably parallel or essentially parallel to each other. This is of advantage in particular when a continuous production of filter bags is produced from endlessly configured webs of filter materials. By means of simultaneous introduction of two weld seams, with the first bar, a sealing weld seam of a first vacuum cleaner filter bag can be produced and, with the second bar, a further sealing weld seam of a second vacuum cleaner filter bag. After completion of the welding process, the web which is now welded at places and made of a plurality of layers of filter material can be cut to length in the region of the spacing between the two bars so that two separate filter bags are produced.

In the case of the previously mentioned preferred embodiment, it can be provided furthermore that, between the first bar and the second bar, at least one third bar which is projected in a z-direction with a planar working surface which terminates in z-direction is disposed, with recesses extending in z-direction, defining a plurality of weld faces, the working surface of the at least one third bar having the same dimensioning, i.e. height in z-direction, as that of the at least one first bar.

With this third bar, a further weld profile with welded and non-welded regions can be introduced in a vacuum cleaner filter bag. As described already previously, this weld profile is introduced between the two resulting weld seams which respectively seal a vacuum cleaner filter bag. The weld profile produced with this third bar is hence situated outside the internal space of the vacuum cleaner filter bag. This weld profile serves for the purpose of strengthening components of the filter material in order to prevent the filter material becoming frayed or being able to escape from the vacuum cleaner filter bag. In particular when using multilayer nonwoven materials or fibre nonwoven materials in the sense of EP 1 795 247 A1, the result can be that individual fibres of the nonwoven material or of the fibre nonwoven material protrude at the side edge of the vacuum cleaner filter bag and, during handling of the vacuum cleaner filter bag, are pulled out from the region of the vacuum cleaner filter bag, as a result of which the filter material in the region of the weld seam can possibly be damaged. As a result of this third bar and corresponding introduction of a weld pattern outside the weld seam, these individual fibres of the corresponding filter materials are additionally fixed and hence secured. If a continuous method, as described previously, for the production of the vacuum cleaner filter bags is implemented (i.e. quasi-endless webs of filter material are used), it is preferred if the then welded webs of filter material are cut to length in the region of this third bar. The cutting to length is effected particularly preferably mirror-symmetrically relative to the course of the two outer bars.

In addition, the present invention relates to an ultrasonic welding unit which has a tool as described above.

According to a first embodiment, the tool is thereby formed as an anvil. In this case, the ultrasonic welding unit has, as counterpart to the tool, at least one sonotrode with in particular a continuously configured working surface. The sonotrode and the tool acting as anvil are thereby disposed moveably relative to each other so that, during the welding process, the sonotrode and the at least one first bar are disposed one above the other. In the case where the tool has a plurality of functions, the ultrasonic welding unit comprises a number of sonotrodes which corresponds to the number of bars and which sonotrodes are assigned respectively to one bar so that, during the welding process, the at least one second bar and possibly the at least one third bar are disposed one above the other with the respective sonotrode.

According to a further alternative embodiment hereto, the tool is thereby configured as sonotrode and is operated as such during the welding process. In this case, the ultrasonic welding unit comprises, as counterpart to the tool, at least one anvil with for example a continuously configured working surface. The anvil and tool are hereby disposed moveably relative to each other such that, during the welding process, the anvil and the at least one first bar are disposed one above the other, possibly the at least one second bar and possibly the at least one third bar are disposed one above the other.

In the case where the tool has a plurality of functions, the ultrasonic welding unit comprises a number of anvils which corresponds to the number of bars and which sonotrodes are assigned respectively to one bar so that, during the welding process, the at least one second bar and possibly the at least one third bar are disposed one above the other with the respective anvil.

The present invention is described in more detail with reference to the subsequently appended Figures without restricting the invention to the specially produced embodiments.

FIG. 1 shows the plan view on the working surface of a tool according to the invention in z-direction.

FIG. 2 shows the side view of a tool according to the invention in y-direction.

FIG. 3 shows the plan view on a tool according to the invention in x-direction.

FIG. 4 shows the complete view of a tool according to the invention in y-direction.

Figure 5A:
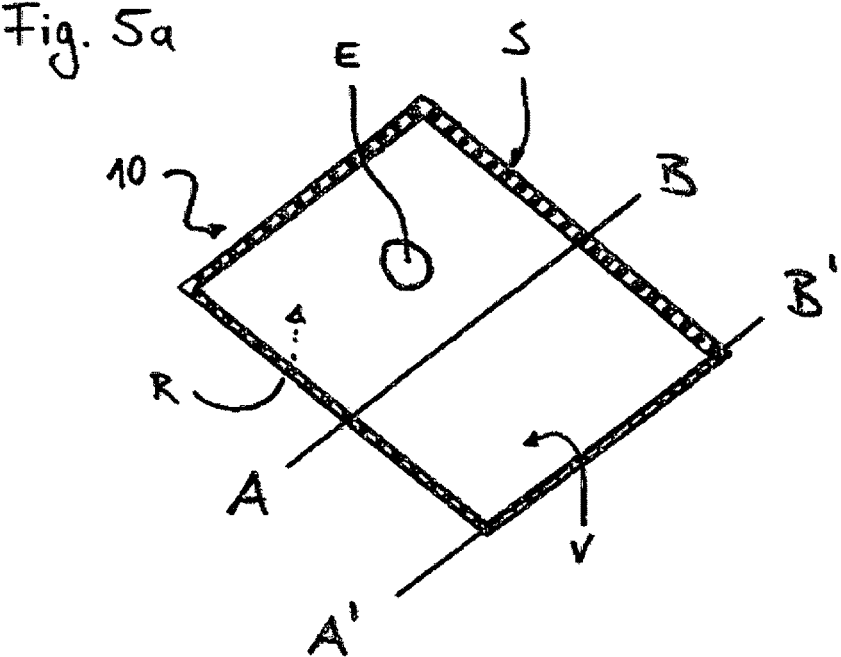
FIG. 5 shows a vacuum cleaner filter bag according to the invention which is configured as a flat bag.

FIG. 1 shows a section of a plan view onto a section of the working surface of a tool 1 according to the invention. The tool 1 thereby has a basic body G and also two bars 2 and 2' which protrude from the basic body G in z-direction. The bars 2 and 2' thereby extend in x-direction. The bars 2 or 2' thereby have notches 3 or 3', the surface of the bars 2 or 2' is hereby notched and recessed at the bottom in z-direction. By means of the notches 3 and 3', the projecting weld faces 4 or 4' which protrude from the working surface of the tool 1 in z-direction are thereby produced.

The notches 3 and 3' are thereby disposed equidistantly in x-direction such that the thereby resulting weld faces 4 or 4' are configured to be of equal length (and likewise equally wide). The two bars 2 and 2' of the tool 1 are thereby configured to be mirror-symmetrical with respect to an x-axis. The minimum spacing of these two bars d is configured the same over the entire x-dimensioning of the tool 1 so that the bars 2 and 2' extend parallel to each other.

In x-direction, the length of the weld faces 4 and 4' is thereby between 1.0 and 10 mm, whilst the length of the notches in x-direction 3 or 3' is between >10 mm to 10 mm.

The weld faces 4 or 4' of the respective bars 2 or 2' thereby have a width B or B', i.e. a dimensioning in y-direction.

Between the bars 2 and 2', a further bar 2" is thereby disposed, which likewise has projected weld faces 4" in z-direction. The respective weld faces 4" are thereby separated from each other by notches 3". The bar 2' has, compared with bars 2 or 2', merely half as many notches so that the weld faces 4" appear only half as often in x-direction as in bars 2 or 2'.

At the places at which a weld face 4" coincides, in x-direction, with a weld face 4 or 4', these are separated from each other by notches 5 or 5'.

Whilst the notches 3 or 3' of the bar 2 or 2' can have for example a triangular configuration (see also FIG. 2 in this respect) so that the notches have corresponding sides F, the notches 3" or the notches 5 or 5' present between the bars can also be configured differently and for example have no edges, for example have a round profile (see also FIG. 3 in this respect).

FIG. 2 shows a plan view on the xz-plane of the tool 1. The regularly disposed notches 3 which have a triangular configuration and have respectively sides F are hereby detectable. The sides are thereby disposed at an angle α relative to each other. In FIG. 2, the interaction of the weld faces 4 and the weld faces 4" is likewise detectable, the repetition rate of the weld faces 4" in x-direction is thereby merely half as high as the repetition rate of the weld faces 4 for example of the first bar 2 so that weld faces 4" of the bar 2" are present merely at the rate of each second weld face 4 of the bar 2.

FIG. 3 shows a plan view on the tool according to the invention in x-direction, i.e. on the yz-plane. FIG. 3 corresponds to a section in the yz-plane through FIG. 1 at a place at which both weld faces 4, 4' and 4" are configured. In FIG. 3, the respective weld faces 4, 4' and 4" are illustrated detectably as projected in z-direction, these weld faces are thereby separated from each other by notches 5 or 5' which, in the case of the embodiment of FIG. 3, present semi-circular notches.

FIG. 4 finally illustrates the total perspective view of a welding tool 1 according to the invention, in particular the enlarged dimensioning of the basic body G is hereby illustrated. The welding tool according to the invention has notches 3 or a corresponding number of weld faces 4 for the case of the embodiment 80 illustrated in FIG. 4, by way of example.

Figure 5B:
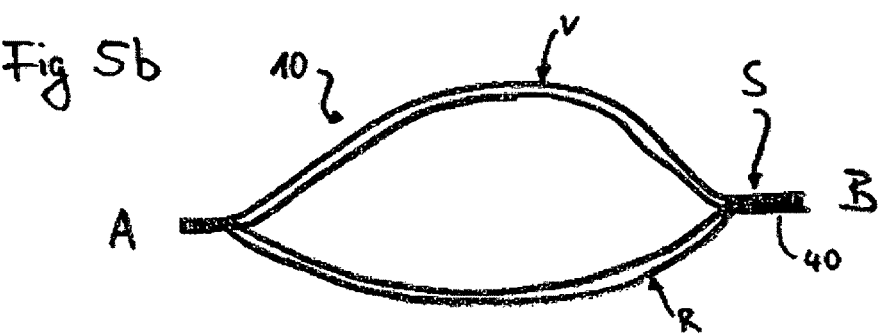
Figure 5C:
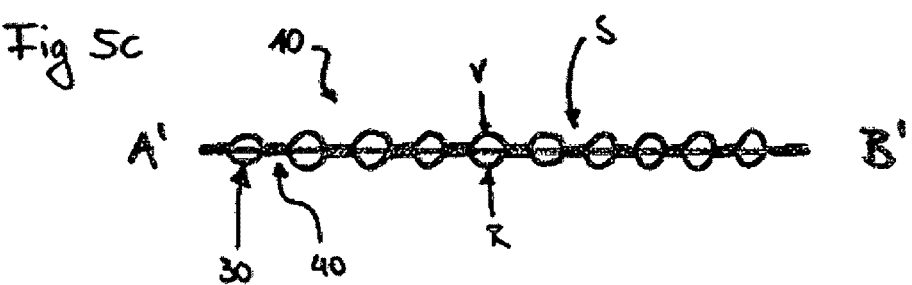

FIGS. 5a to 5c show a vacuum cleaner filter bag 10 according to the invention which is configured as a flat bag. FIG. 5a thereby shows a perspective plan view on the front-side V of the vacuum cleaner filter bag 10 according to the invention in the form of a flat bag, whilst FIG. 5b shows the section through the vacuum cleaner filter bag at the section line A-B illustrated in FIG. 5a. FIG. 5c shows a section through the line A'-B' illustrated in FIG. 5a, i.e. through the circumferential weld seam S.

The vacuum cleaner filter bag 10 in the form of a flat bag according to FIG. 5a thereby has a front-side V and also a rear-side R. Front- and rear-side V or R are thereby formed respectively from a thermally weldable filter material, for example a single or multilayer nonwoven material. The front-side V thereby has an inflow opening E, by means of which the discharge connection piece of a vacuum cleaner, not illustrated, can be connected to the vacuum cleaner filter bag 10. The front-side V and the rear-side R are joined together other circumferentially by a weld seam S.

The section through the vacuum cleaner filter bag, as illustrated in FIG. 5b, shows the join of the front-side V and of the rear-side R of the vacuum cleaner filter bag via the weld seam S. Front- and rear-side are held together by welded regions 40 of the weld seam S.

In FIG. 5c, the configuration according to the invention of the weld seam is illustrated at the position of the section A'-B', as shown in FIG. 5a. The weld seam S thereby has non-welded regions 30 and also welded regions 40 which are alternating and equidistant. In the region of the welded regions 40, the filter material of the front-side V and of the rear-side R is joined together. During the welding process, the result hereby is melting and adhesion of the thermally weldable filter material both of the front-side V and of the rear-side R. In the region of the non-welded regions 30, no melting of the layers of the filter material hereby takes place. The filter material both of the front-side V and of the rear-side R is preserved here. The layers of filter material V and R are hereby situated however one above the other in a form-fit and are shaped to form beads. The configuration according to the invention of the weld seam thereby provides that the non-welded regions 30 have, along the weld seam, i.e. in the case of the illustration in FIG. 5c given by way of example, along the section line A'-B', a dimensioning of >1.0 mm to 5.0 mm. The welded regions 40 thereby have a longitudinal dimensioning along the section line A'-B' of 1.0 mm to 10.0 mm. Preferably, the non-welded regions 30 and the welded regions 40 are disposed alternating and equidistantly, i.e. non-welded regions 40 and welded regions 30 alternate at the same repetition rate.

Figure 6A:
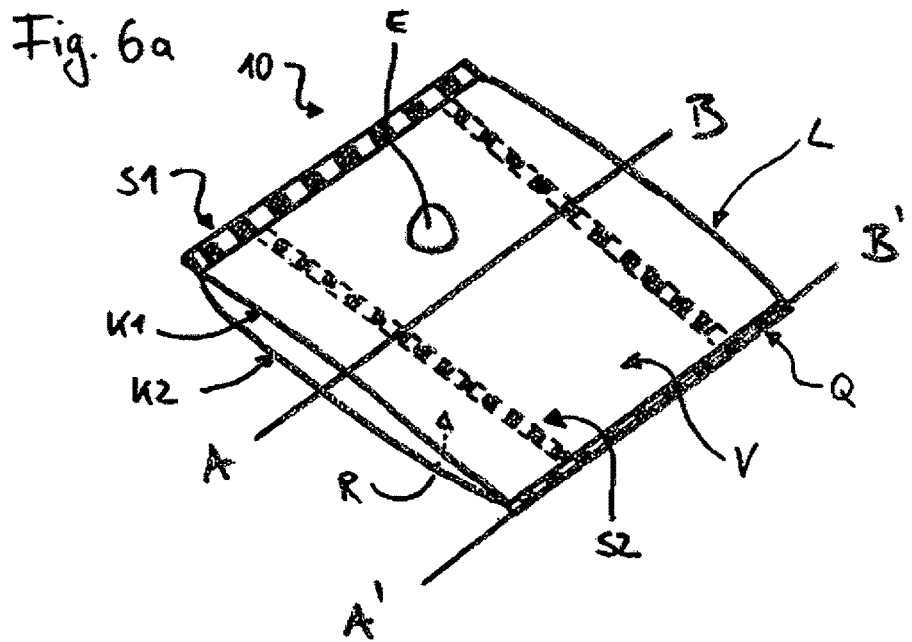
FIG. 6 shows a vacuum cleaner filter bag according to the invention which is configured as a side-bag.

FIG. 6a illustrates a vacuum cleaner filter bag 10 according to the invention in the form of a side-gusseted bag. This vacuum cleaner filter bag 10 has two longitudinal sides L and also two transverse sides Q and also likewise a front-side V and a rear-side R. Front-side V and rear-side R are likewise formed from a thermally welded filter material, for example a single or multilayer nonwoven material. On the front-side V, an inflow opening E is present. In the region of the longitudinal sides L, the filter material is folded in both on the front-side V and on the rear-side R so that, on the longitudinal side, two side edges K1 and K2 are present. The side edge K1 is thereby present in the filter material of the front-side V, whilst the side edge K2 is assigned to the filter material web of the rear-side R. The front-side V and rear-side R are thereby joined, on the end-side, i.e. in the region of the transverse side Q, by means of a weld seam S1, in the region of the fold, front-side V and rear-side R are joined by means of a weld seam S2.

Figure 6B:
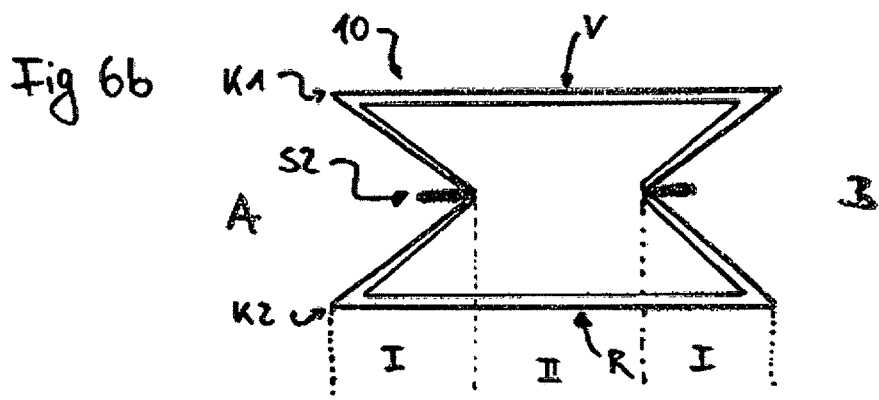

FIG. 6b illustrates a section through the vacuum cleaner filter bag 10 according to the invention in the form of a flat bag along the section line A-B, as illustrated in FIG. 6a. It is detectable how the filter material of the front-side V and also of the rear-side R is present folded in and is joined there by means of a weld seam S2. As a result of the folding-in, the side-edges K1 are thereby produced in the front-side V or K2 in the rear-side R. By means of folding in the front-side V and the rear-side R, there are thereby produced, in the vacuum cleaner filter bag 10 as a flat bag, two regions I and II, of which—in the projection direction of front-side V on the rear-side R—for example four layers of filter material being disposed one above the other (region I) or two layers of filter material being disposed one above the other (region II).

Figure 6C:
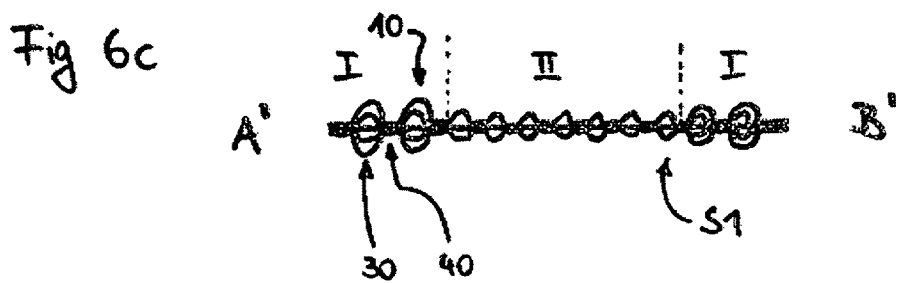

FIG. 6c shows a section along the section line A'-B' according to FIG. 6a, i.e. through a weld seam S1, disposed on the end-side, of the vacuum cleaner filter bag 10 according to the invention in the form of a side-gusseted bag. This weld seam S1 thereby has non-welded regions 30 or welded regions 40, at which the layers of filter material of the front-side V and of the rear-side R, which are situated respectively one above the other, are joined together. All the layers of filter material are melted together inside the weldable regions 40. In region I in which, as illustrated in FIG. 6b, four layers of filter material are situated one above the other, all of the four layers are joined together in the region of the welded regions 40. In region II, merely two layers of filter material are welded together inside the welded regions 40, i.e. are present melted together. The non-welded regions 30 are thereby disconnected inside regions I such that the four layers of filter material, present there, are present not joined together, but are present pressed together in a form-fit. The beads illustrated in FIG. 6c are hereby produced. Inside region II, merely two layers of filter material are present so that here an identical configuration of the weld seam, as in FIG. 5c, is illustrated. The weld seam S2, i.e. the weld seam situated inside the vacuum cleaner filter bag at the join of the front-side V and of the rear-side R can thereby be configured identically as in FIG. 5c.

Table 1 shows test results which can be achieved in the case of vacuum cleaner filter bags with weld seams configured according to the invention.

TABLE 1

| Examples | Basis weight of nonwoven (g/m$^2$) | Number of welded layers (n) | Total basis weight (g/m$^2$) | Width of the weld face (mm) | Length of the weld face (mm) | Spacing between the weld faces (mm) | Angle (°) | Tensile strength at break (N) |
|---|---|---|---|---|---|---|---|---|
| 1* | 175 | 4 | 700 | 1.0 | 2.0 | 0.8 | 45 | 29 |
| 2 | 175 | 4 | 700 | 1.5 | 2.5 | 1.5 | 45 | 102 |
| 3 | 175 | 4 | 700 | 1.5 | 3.0 | 2.0 | 60 | 103 |
| 4 | 175 | 4 | 700 | 1.5 | 2.5 | 2.5 | 90 | 95 |

Table 1 shows the results of the tearing strength (tensile strength at break) measurements with reference to welded filter materials according to DIN EN 29073-3. The welded filter materials to be examined are thereby clamped between the jaws of the tensile testing machine such that the weld seam to be tested is disposed centrally between the jaws. The test pieces thereby have 4 welded material layers, respectively two layers of material are hereby clamped into respectively one jaw of the tensile testing machine. The weld seams of the examined test pieces thereby have alternately disposed welded and non-welded regions. In the case of comparative example 1*, the spacing between the weld faces is respectively merely 0.8 mm, whilst, in the examples 2-4 according to the invention, the spacing between the weld faces is chosen to be greater.

Comparative example 1* shows clearly that a small spacing between the weld faces delivers poor results in particular with a high total basis weight of the welded material layers. The examples 2, 3 and 4 according to the invention, which are comparable hereto, display surprisingly significantly higher tensile strengths at break in total of the resulting weld seam although the density of the weld points turns out to be smaller because of the greater spacing of the welded regions relative to each other than in the case of comparative example 1*.

Example 2 shows that increasing the spacing between the weld faces to for example 1.5 mm has excellent effects on the maximum tensile strength of the sample. In particular in the case of four welded material layers, an increase of tensile strength at break by approx. 300% can be detected. Increasing the spacing between the weld faces influences the result hence in a surprisingly positive manner. Also further increasing the spacing between the weld faces (see for example examples 3 and 4) shows clearly that surprisingly, in particular with high total area weights, i.e. for example four welded layers, a significant increase in tensile strength at break can be observed.

The invention claimed is:

1. A vacuum cleaner filter bag made of a thermally weldable filter material, a sealed internal space of the vacuum cleaner filter bag being defined by the filter material, the internal space being closed at least on one side of the vacuum cleaner filter bag by a linearly extending weld seam, in which at least two layers of filter material are welded together,
   the weld seam has, in a direction of a linear course, alternately welded and non-welded regions of the at least two layers, the welded regions having a dimensioning, measured in the direction of the linear course, of 1.0 mm to 10.0 mm a dimensioning, measured perpendicular to the linear course of 1.3 mm to 10.0 mm and the non-welded regions having a dimensioning, measured in the direction of the linear course, of >1.0 mm to 5.0 mm.

2. The vacuum cleaner filter bag according to claim 1, wherein the non-welded regions have the dimensioning, measured in the direction of the linear course, of 1.2 mm to 5.0 mm.

3. The vacuum cleaner filter bag according to claim 1, wherein the welded regions have the dimensioning, measured in the direction of the linear course, of 1.5 mm to 7.5 mm.

4. The vacuum cleaner filter bag according to claim 1, wherein, in the direction of the linear course of the weld seam, the dimensioning of the welded regions is greater than the dimensioning of the non-welded regions.

5. The vacuum cleaner filter bag according to claim 1, wherein the alternating arrangement of the welded and non-welded regions is equidistant.

6. The vacuum cleaner filter bag according to claim 1, wherein the weld seam has a dimensioning, measured perpendicular to the linear course of 1.3 mm to 5.0 mm.

7. The vacuum cleaner filter bag according to claim 1, wherein the welded regions have a substantially rectangular or rectangular configuration.

8. The vacuum cleaner filter bag according to claim 1, wherein each layer of the filter material is a single or multilayer nonwoven material, preferably with a total basis weight of at least 400 g/m2.

9. The vacuum cleaner filter bag according to claim 8, wherein the nonwoven material has at least 3 layers.

10. The vacuum cleaner filter bag according to claim 1, wherein the weld seam has a tensile strength, measured according to DIN EN 29073-3, of at least 30 N.

11. The vacuum cleaner filter bag according to claim 1, wherein
   a) in the form of a flat bag in which at least two layers of the filter material are welded together circumferentially at the edge, the welding being configured at least in regions, as weld seam, as defined in claim 1, or
   b) in the form of a side-gusseted bag in which the vacuum cleaner filter bag has two longitudinal- and two transverse sides, at least two layers of the filter material being welded together on the longitudinal side and being folded into the vacuum cleaner filter bag and being welded together on the transverse side, at least the transverse-side weld seams being configured as defined in claim 1, or
   c) in the form of a 3D bag or block- or block-bottom bag in which at least two layers of the filter material are welded with a weld seam as defined in claim 1.

12. A method for the production of a vacuum cleaner filter bag according to claim 1, in which at least one linearly extending weld seam is produced by thermal welding, the weld seam having, in the direction of the linear course, alternately welded and non-welded regions of the at least two layers, the welded regions having a dimensioning, measured in the direction of the linear course, of 1.0 mm to 10.0 mm and the non-welded regions having a dimensioning, measured in the direction of the linear course, of >1.0 mm to 10.0 mm.

13. The method according to claim 12, wherein the linear weld seam is produced by ultrasonic welding, a tool being used, comprising a basic body and also at least one bar which extends longitudinally in an x-direction, has a width (B) in a y-direction and is projected in a z-direction, with a planar working surface which terminates in the z-direction and has a plurality of notches which extend parallel in the y-direction and are recessed starting from the working surface in the z-direction, defining a plurality of weld faces, a longitudinal dimensioning of the notches in the x-direction being of >1.0 mm to 10.0 mm and a longitudinal dimensioning of the weld faces in the x-direction being 1.0 mm to 10.0 mm, and also a counterpart to the tool which is disposed above the bar during the welding process, the at least two layers of filter material for producing the weld seam being disposed between the tool and counterpart, tool and counterpart being moved towards each other so the at least two layers of filter material are adapted and, for the welding, ultrasound is coupled into the counterpart or into the tool.

* * * * *